(12) United States Patent
Hamel et al.

(10) Patent No.: US 6,314,280 B1
(45) Date of Patent: *Nov. 6, 2001

(54) AUDIO BEZEL AUTOMATIC IDENTIFICATION

(75) Inventors: Gregory Roger Hamel, El Paso, TX (US); Jorge Morales, Chihuahua (MX)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/938,814

(22) Filed: Sep. 25, 1997

(51) Int. Cl.$^7$ ..................................................... G06F 19/00
(52) U.S. Cl. ........................ 455/345; 455/346; 455/347; 455/348; 700/95
(58) Field of Search ............................. 345/173; 200/5 A, 200/296; 361/814; 700/95, 84; 455/90, 344, 345, 346, 347, 348, 349

(56) References Cited

U.S. PATENT DOCUMENTS

| | | |
|---|---|---|
| 4,297,726 | 10/1981 | Nicholson et al. . |
| 4,360,858 | 11/1982 | Fahling . |
| 5,077,832 | 12/1991 | Szcutkowski et al. . |
| 5,175,926 | 1/1993 | Chapman . |
| 5,202,585 | 4/1993 | Aoyagi et al. . |
| 5,349,698 | 9/1994 | Maru . |
| 5,570,114 | * 10/1996 | Fowler ................................. 345/173 |
| 5,666,274 | * 9/1997 | Corso .................................. 361/814 |
| 5,739,486 | * 4/1998 | Buckinham .......................... 200/5 A |
| 5,887,704 | * 3/1999 | Schorpp et al. ..................... 200/296 |
| 5,911,121 | 6/1999 | Andrews . |
| 6,097,991 | * 8/2000 | Hamel et al. .......................... 700/95 |

* cited by examiner

*Primary Examiner*—Lee Nguyen
(74) *Attorney, Agent, or Firm*—Larry I. Shelton

(57) ABSTRACT

An automatic identification of the features associated with an audio system for a vehicle based on the selection of the associated bezel (14). The audio system includes a printed circuit board (34) having at least one finger pad (30) thereon in communication with a microprocessor (16). The microprocessor (16) includes programming sequences for various possible features for the audio system. The bezel (14) may have no, one or multiple programming tabs (36) in alignment with corresponding finger pads depending upon the model of bezel chosen. Contact of the finger pads due to the programming tabs will indicate to the microprocessor which programming sequence needs to be initiated to activate the appropriate features corresponding to that particular bezel installed on the audio assembly.

22 Claims, 3 Drawing Sheets

AUDIO BEZEL AUTOMATIC IDENTIFICATION

FIELD OF THE INVENTION

The present invention relates to vehicular audio systems and more particularly to audio systems having differing models with multiple functions and corresponding bezels.

BACKGROUND OF THE INVENTION

Current audio systems are generally designed and manufactured separately according to the particular features available on a specific model. Many of the various functions can now be controlled by software with a microprocessor rather than hardware. Some examples of such functions are station search functions, digital signal processing (DSP) functions, etc. Microprocessor control is possible and preferred in that a change from one set of functions to another is just a matter of a different software download or selection.

Existing radio bezels exhibit considerable complexity to account for different functions and to meet various market requirements. A given base model of radio may have several derivatives that have unique features associated with the buttons to implement different features such as clock versions, digital signal processing (DSP) features, noise reduction, etc. These features require unique plastic bezel assemblies with the associated button differences and thus result in high cost in audio systems due to the extra assemblies and manufacturing operations.

Consequently, in order to reduce costs, it is highly desirable and current practice to utilize common hardware, including the circuit board and microprocessor software for all radio models in a given product family, with only software variations. Some achieve these objectives by configuring the system so that the circuit board is strapped with resistors or jumpers that are interfaced to the microprocessor. These strapping resistors are configured to identify the configuration (for the particular model) that the microprocessor will run in its internal code to match the model features and bezel assembly. For those who employ this, current practices tie this resistor-configured board assembly to the intended plastic bezel assembly with assembly part numbers, computer tracking methods and bills-of materials. This requires considerable effort to track and maintain the parts and allows for possible errors. Further, the identifying resistors are added parts with associated material and manufacturing costs.

Thus, it is desirable to have an audio system which allows for various models with the same hardware, while allowing for different software base features to be changed for a given model of audio system based upon the corresponding model of bezel selected. Preferably, this will be accomplished with minimum cost and complexity concerns.

SUMMARY OF THE INVENTION

In its embodiments, the present invention contemplates an audio system for a vehicle. The audio system comprises an audio assembly including a housing with a processor mounted therein and selectable features contained in programming code in the processor, and with contact programming means for sensing contact therewith and being in communication with the processor. The system also includes a bezel, including buttons mounted thereon, and programming means for being selectably contactable with portions of the contact programming means. An initialization means is included for selecting portions of the programming code based upon the number and location of programming means contacting the contact programming means, whereby the selected programming code determines the features corresponding to the bezel Accordingly, an object of the present invention is to allow the microprocessor in an audio component to automatically identify the software routines needed for providing features in correspondence with the buttons on a particular bezel based upon the particular bezel assembled to the audio component.

A further object of the present invention is to simplify the fabrication and assembly of vehicular audio components.

An advantage of the present invention is that the cost of fabrication and assembly is reduced by eliminating some parts and reducing the need for human intervention to account for various model features.

DETAILED DESCRIPTION OF THE PREFERRED EMBODIMENTS

Figure 1:
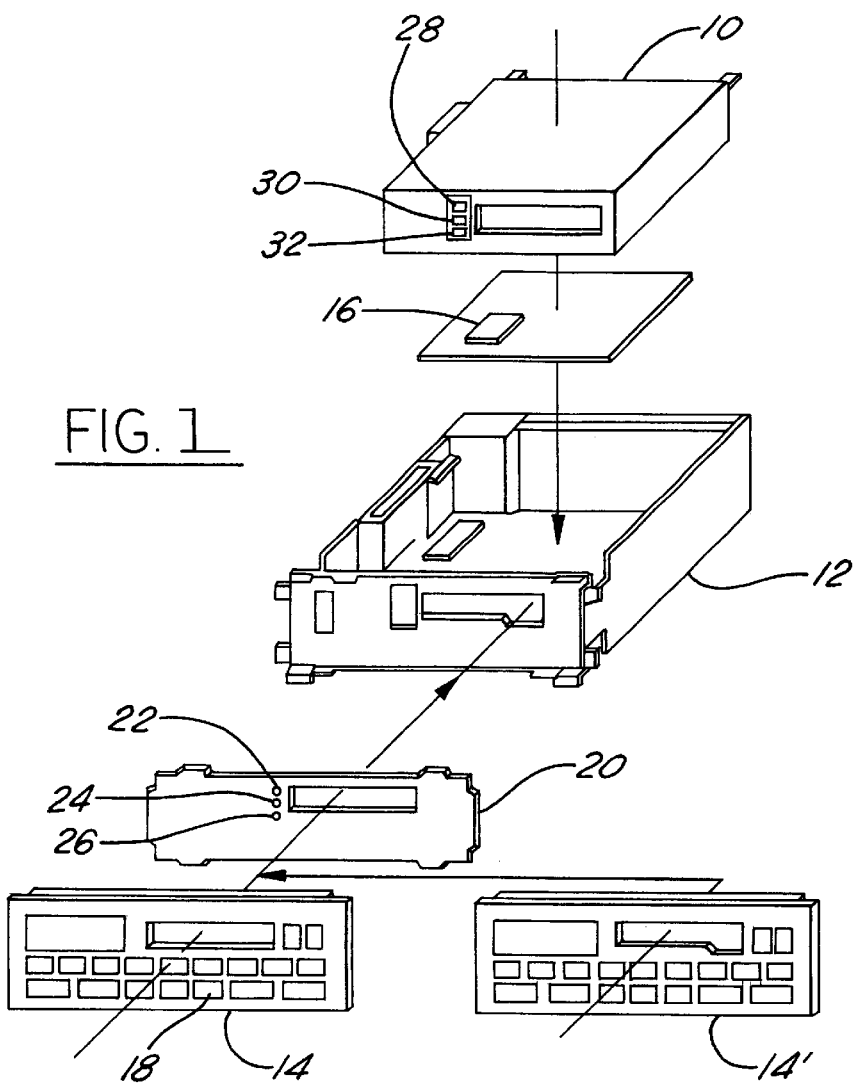
FIG. 1 is a Schematic, partially exploded perspective view of an audio assembly in accordance with first and second embodiments of the present invention.
Figures 2A, 2B:
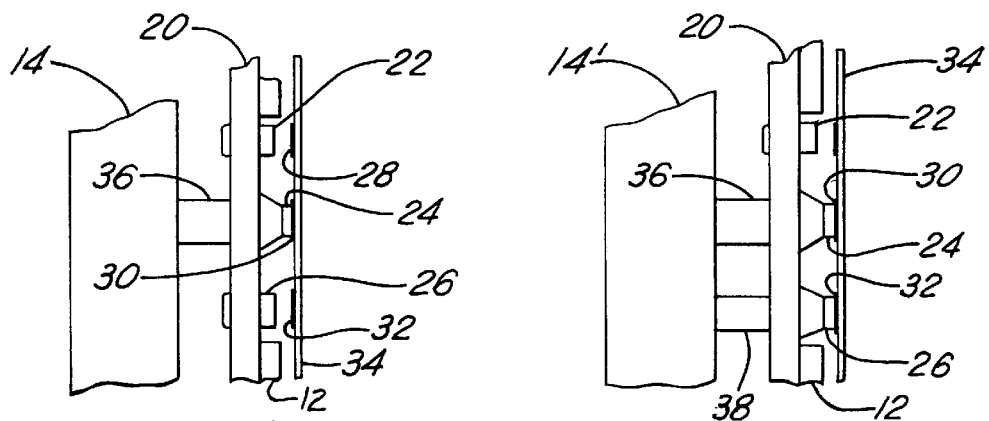
FIG. 2A is a side, schematic view of a radio bezel, mat and circuit board corresponding to the first embodiment of the present invention.
FIG. 2B is a view similar to FIG. 2A corresponding to the second embodiment of the present invention.

FIGS. 1 and 2A illustrate an embodiment of the present invention in which an audio component assembly 10 mounts into a casing 12, which in turn, mounts within a vehicle (not shown). The audio assembly 10 may be just a radio or may also have a cassette, compact disk player, etc.

Within the audio assembly 10 is a programmable microprocessor 16 which contains code used for operating the hardware of the assembly 10. This code includes various subroutines which address various functions performed by the hardware. While any particular subroutine may or may not be loaded into each audio assembly, the hardware is the same for each audio assembly within a particular family of audio assemblies whether it will perform the particular function or not. In this way, the complexity for fabrication and assembly of components is reduced, thus reducing the cost to produce the audio system.

A bezel body 14 mounts to the audio component assembly 10 and includes conventional buttons 18. (Bezel body 14' is also illustrated in FIG. 1, but represents an alternate embodiment, discussed below). A generally conventional elastomeric switchmat 20 is located between the bezel 14 and the casing 12. The switchmat 20 includes conventional conductive pills, not shown, behind each of the buttons 18 to create a contact between the buttons 18 and conventional finger pads, not shown, when the buttons are depressed. In addition, the switchmat 20 includes three conductive pills, 22, 24 and 26. The conductive pills 22, 24, 26 are located so that each aligns with a respective finger pad 28, 30 and 32. These finger pads 28, 30, 32 are, in turn, mounted on a printed circuit board 34 which is in communication with the microprocessor 16.

The bezel 14 includes a programming tab 36 extending outward from its back side. This programming tab 36 is aligned with the middle conductive pill 24 so that when the bezel 14 is installed on the casing 12, the conductive pill 24 will be forced into contact with the finger pad 30 and maintain contact indefinitely. This contact of just the middle finger pad 30, with gaps at the other two, will indicate to the microprocessor 16 that a particular programming sequence needs to be initiated, which is associated with this particular model of bezel 14.

In order to account for and select the different functions one may wish to include on a particular model of audio assembly, the particular bezel body will have different numbers and locations of programming tabs, or have no tab at all (i.e., just a gap or gaps) to indicate a different particular model. Thus one can have just one tab/pad combination and change between having a programming tab on a first bezel and not having a tab on a second bezel to allow for switching between the two sets of functions for two different models of an audio system. The tab/finger pad combinations will be, of course, in sufficient quantity to offer a unique combination of tabs and gaps for each model of radio bezel.

In this way, FIGS. 1 and 2B illustrate a second embodiment of the present invention in which a second programming tab 38 extends from the bezel 14' in addition to the other tab 36. For this embodiment, similar elements are similarly designated, but with altered elements having an added prime. The audio component assembly 10, the casing 12, the switchmat 20, the finger pads 28, 30, 32 and the printed circuit board 34 are the same as in the first embodiment. Thus, one assembling the audio system in a vehicle need only determine which model of bezel needs to be installed and once installed, the correct features will be programmed for that model. In this case, the microprocessor 16 will program a different set of functions than in the first embodiment since both the first 36 and second 38 programming tabs cause contact with their respective finger pads 30, 32. The functions programmed, of course, will correspond to the desired functions of the bezel buttons for this second embodiment.

Figure 3:
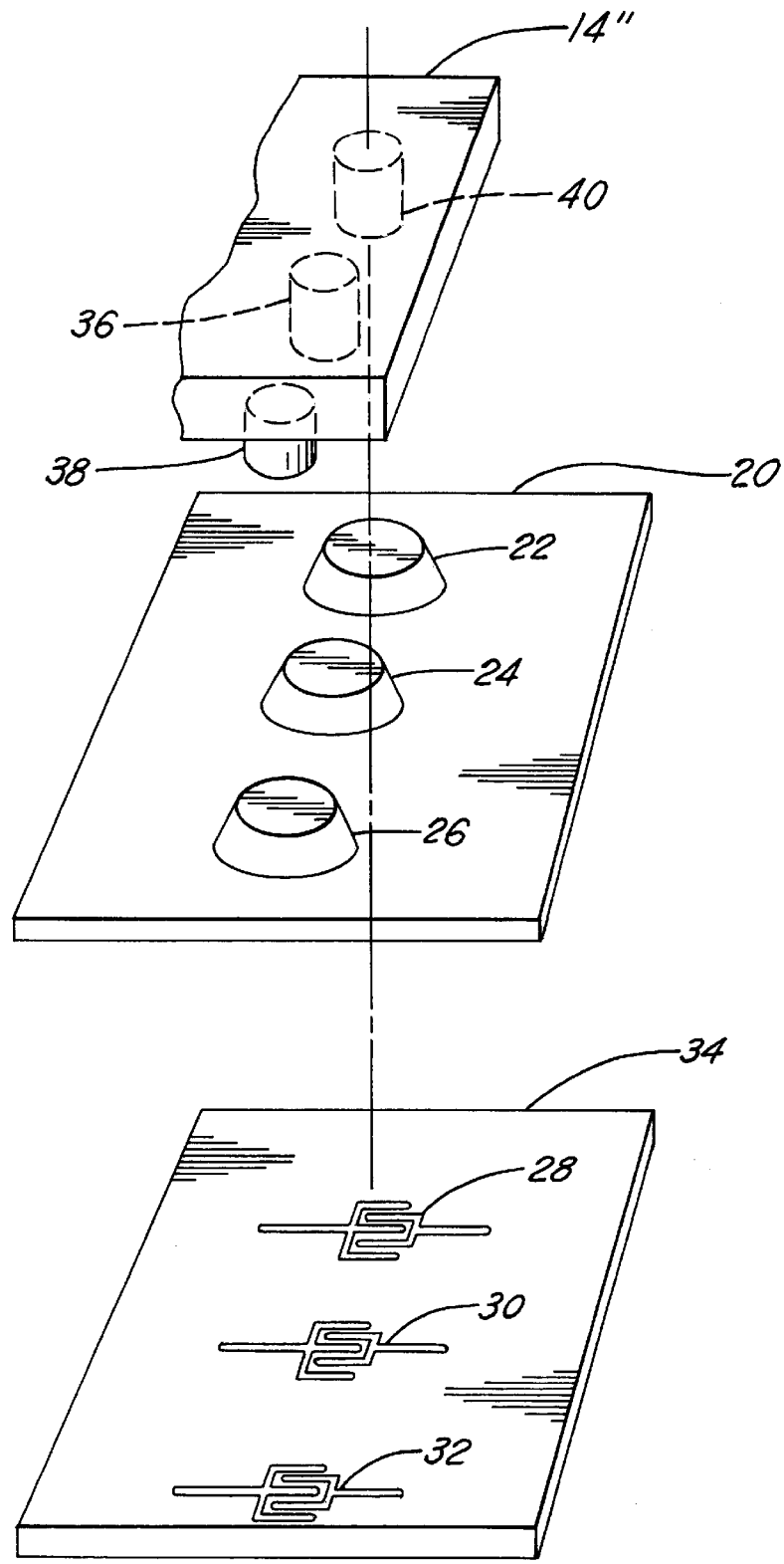
FIG. 3 is a partially exploded, schematic, perspective view of bezel, switchmat and finger pads in accordance with a third embodiment of the present invention.

FIG. 3 illustrates a third embodiment of the present invention in which the elements illustrated in the second embodiment are the same except that a third programming tab 40 extends from the bezel 14" in order to illustrate a different possible programming combination. Of course, with up to three possible programming tabs on different models of bezels, one can have up to eight different combinations of programming tabs (or no programming tabs) in order to account for different functions one wishes to provide with a particular model of the audio system.

Likewise, one can allow for a system set up with different numbers of finger pads and possible tabs when the initial audio system is designed. For example, one may design the system with just two finger pads and up to two possible programming tabs. In this instance, the possible combinations of different models of bezels and programming combinations is four.

Figure 4:
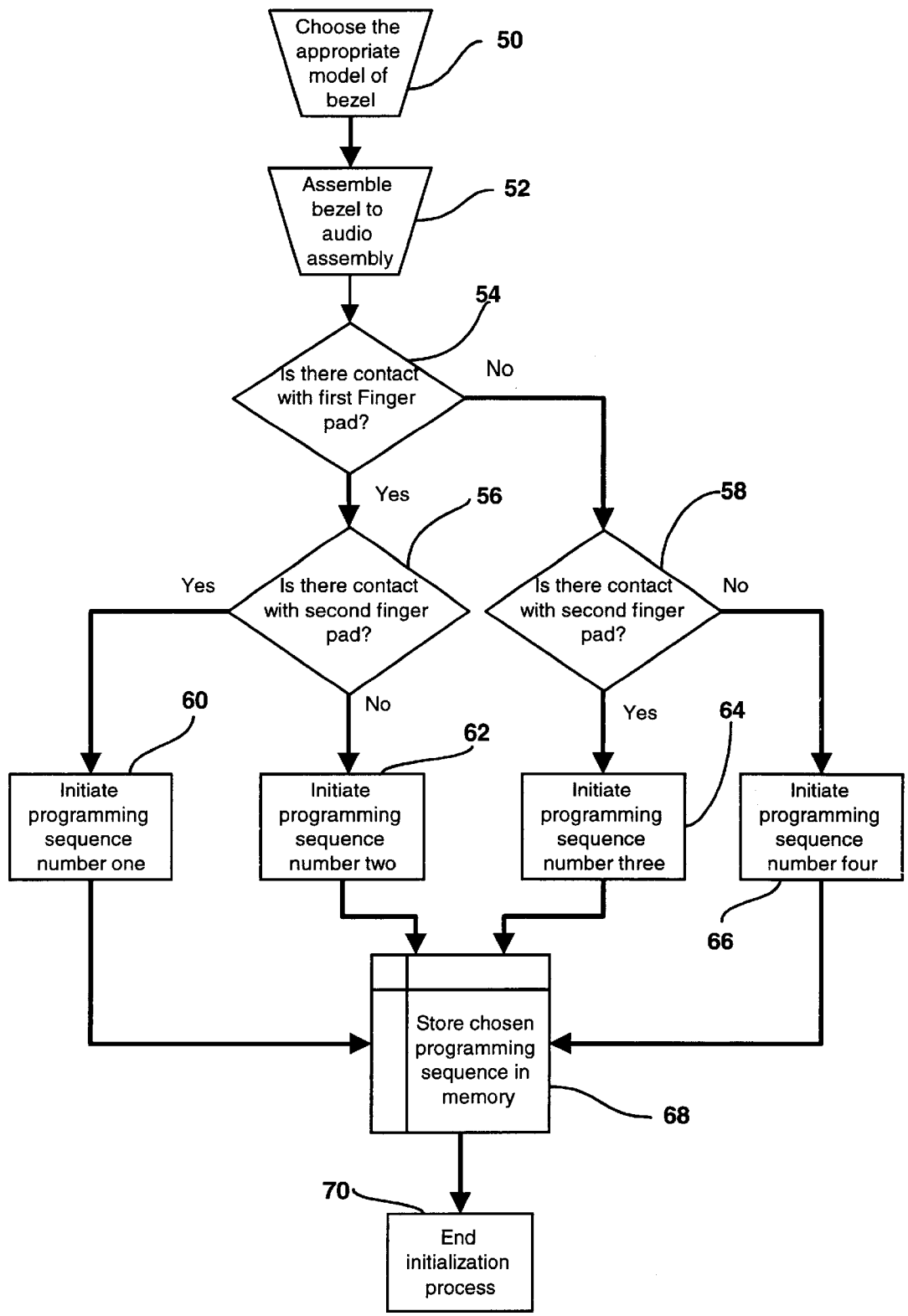
FIG. 4 is a flow chart indicating the decision process made when a bezel is assembled to an audio assembly, in accordance with a fourth embodiment of the present invention.

FIG. 4 illustrates a flow diagram showing the operation of the initial programming sequence used when one of the four possible bezels is installed on a particular audio assembly. For simplification, it is illustrated for an audio unit with only the option of up to two programming tabs and two associated finger pads. Again, this allows for four combinations of bezel models.

The process begins with the selection of the appropriate model of bezel associated with a particular vehicle, shown in block 50. This can be manual or automated selection. The particular model of bezel is, of course, fabricated with the appropriate number and location of programming tabs to match the functions of the buttons on its face. This bezel is then assembled to the audio system, shown in block 52. At this point, the programming tabs, if any, will cause the corresponding conductive pills to contact the associated switchpads, which in turn will signal such to the microprocessor when power is supplied to the audio system.

The microprocessor then determines if there is contact with the first finger pad, shown in block 54, or the second finger pad, shown in blocks 56 and 58. If the bezel includes two tabs, causing contact with both of the finger pads, then programming sequence number one is initiated, shown in block 60. If there is contact with the first finger pad, but there is no contact with the second finger pad, then programming sequence number two is initiated, shown in block 62. When there is an indication of no contact with the first finger pad but contact with the second, then programming sequence number three is initiated, shown in block 64. If there is no contact indicated with either finger pad, a condition in which the particular bezel has no extending tabs, then programming sequence number four is initiated, shown in block 66. These different programming sequences activate particular programming subroutines and are unique to a particular model of bezel. Again, these relate to particular functions such as clock versions, digital signal processing, noise reduction, etc.

The chosen programming sequence is then stored in memory, shown at block 68. To ensure that no degradation from possible future oxidation will interfere with the intent of the automatic identification, preferably the status is read during original testing at the factory and programmed into non-volatile memory circuits. Although, one may, if desired, choose to initiate the programming sequence each time power is supplied to the audio system. This then ends the initialization process (block 70) and the audio system is properly programmed to provide the functions for the chosen bezel installed in that vehicle.

Other alternatives are also possible within the scope of the present invention. For instance, the programming tabs may be movable by the initial installer and so, the programming is set initially and stored in memory at that time. Although, the fixed tabs are more cost effective and easier to ensure proper installation.

As a further alternate embodiment, the switchmat may be eliminated as a contact at the location of the programming tabs, with conductive tips located on the tabs, which will directly contact the finger pads to indicate the corresponding bezel installed.

Another possibility is that the tuner and the amplifier are mounted remotely from the bezel and cassette player (e.g., in the trunk of a vehicle). With such an arrangement, the signal from the finger pads associated with the programming tabs is transferred back to the microprocessor on the remote components to accomplish the programming function.

While certain embodiments of the present invention have been described in detail, those familiar with the art to which this invention relates will recognize various alternative designs and embodiments for practicing the invention as defined by the following claims.

We claim:

1. An audio system for a vehicle comprising:
   an audio assembly including a housing with a processor mounted therein and selectable features contained in programming code in the processor, and with contact programming means for sensing contact therewith and being in communication with the processor;

a bezel, including buttons mounted thereon, and programming means for being selectably contactable with portions of the contact programming means; and initialization means for selecting portions of the programming code based upon the number and location of programming means contacting the contact programming means, whereby the selected programming code determines the features corresponding to the bezel.

2. The audio system of claim 1 wherein the contact programming means is at least one programming finger pad, contactable with the programming means, and in communication with the processor.

3. The audio system of claim 2 wherein the programming means comprises one of either no finger pad contact and a programming tab extending from the bezel in conductive contact with the at least one finger pad.

4. The audio system of claim 1 wherein the programming means comprises one of either no programming means in contact with the contact programming means and a programming tab extending from the bezel in contact with the contact programming means.

5. The audio system of claim 4 further comprising an elastomeric mat mounted between the contact programming means and the programming tab, including means for providing contact between the programming tab and the contact programming means.

6. The audio assembly of claim 5 wherein the means for providing contact includes at least one carbon pill aligned with the programming tab.

7. The audio assembly of claim 4 wherein the programming means includes one of either no programming tab, one programming tab and two programming tabs, and the contact programming means includes at least two finger pads with selectable alignment for contact with the programming tabs.

8. The audio assembly of claim 7 further comprising an elastomeric mat mounted between the bezel and finger pads, and conductive pills mounted in the elastomeric mat between any programming tabs and the finger pads.

9. The audio assembly of claim 4 wherein the contact programming means includes at least three finger pads and the programming means includes up to three programming tabs, each alignable with a different one of the finger pads.

10. The audio assembly of claim 1 wherein the programming means includes up to two programming tabs and the contact programming means includes at least two programming finger pads.

11. The audio assembly of claim 10 further comprising an elastomeric mat mounted between the bezel and finger pads, and at least two conductive pills mounted in the elastomeric mat, each adjacent to a respective one of the finger pads.

12. The audio assembly of claim 1 wherein the programming means includes up to three programming tabs and the contact programming means includes as least three finger pads.

13. An audio system for a vehicle comprising:

an audio assembly including a housing with a processor mounted therein and selectable features contained in programming code in the processor, and with at least one programming finger pad for sensing contact therewith and being in communication with the processor;

a bezel, including buttons mounted thereon, and one of either no finger pad contact and at least one programming tab extending from the bezel in conductive contact with the at least one programming finger pad; and initialization means for selecting programming code based upon the number and location of the programming tabs contacting the finger pads, whereby the selected programming code determines features corresponding to the bezel.

14. The audio system of claim 13 further comprising an elastomeric mat mounted between the bezel and finger pads, and conductive pills mounted in the elastomeric mat between any programming tabs and the corresponding finger pads.

15. The audio system of claim 14 wherein the at least one programming finger pad comprises two programming finger pads, and the bezel includes up to two programming tabs extending therefrom selectably alignable for contact with the two finger pads.

16. The audio system of claim 14 wherein the at least one programming finger pad comprises three programming finger pads, and the bezel includes up to three programming tabs extending therefrom selectably alignable for contact with the three finger pads.

17. An audio system for a vehicle comprising:

an audio assembly including a housing with a processor mounted therein having selectable features contained within the processor, and with at least one programming finger pad for sensing contact therewith and being in communication with the processor;

a bezel including buttons mounted thereon and programming means, for being selectably contactable with the at least one programming finger pad; and initialization means for selecting the selectable features based upon the number and location of programming means contacting the contact programming means, whereby the selected features correspond to the bezel.

18. The audio system of claim 17 further comprising an elastomeric mat mounted between the programming means and the at least one finger pad, and at least one conductive pill mounted in the elastomeric mat aligned with the at least one finger pad.

19. The audio system of claim 18 wherein the programming means comprises one of either no finger pad contact and a programming tab extending from the bezel encouraging contact between the conductive pill and the finger pad.

20. The audio system of claim 19 wherein the at least one programming finger pad comprises three programming finger pads and the bezel includes up to three programming tabs extending therefrom selectably alignable for contact with the three finger pads via the carbon pills mounted in the elastomeric mat.

21. An audio system for a vehicle comprising:

an audio assembly including a housing with a processor mounted therein and selectable features contained in programming code in the processor, and with contact programming means for sensing contact therewith and being in communication with the processor;

a bezel, including buttons and a programming tab mounted thereon for being contactable with portions of the contact programming means;

initialization means for selecting portions of the programming code based upon the number and location of the programming tab contacting the contact programming means, whereby the selected programming code determines the features corresponding to the bezel.

22. The audio system according to claim 21 wherein the programming tab is in constant contact with the contact programming means such that the bezel features are continuously known by the processor.

* * * * *